UNITED STATES PATENT OFFICE.

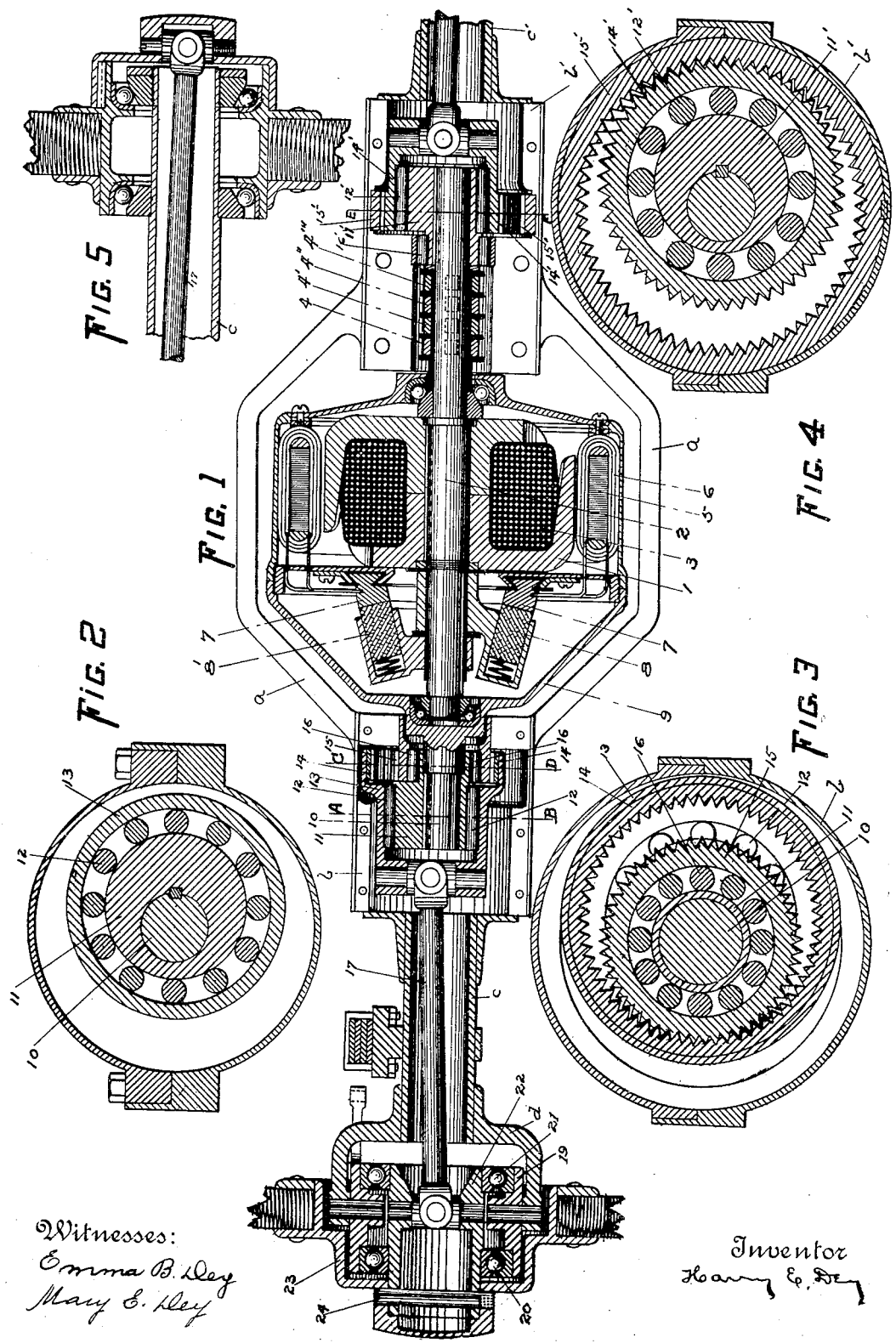

HARRY EUGENE DEY, OF JERSEY CITY, NEW JERSEY.

GEARING.

1,158,456.  Specification of Letters Patent.  Patented Nov. 2, 1915.

Application filed January 18, 1912. Serial No. 671,994.

*To all whom it may concern:*

Be it known that I, HARRY EUGENE DEY, a citizen of the United States, and a resident of Jersey City, in the county of Hudson and State of New Jersey, have invented certain new and useful Improvements in Gearing, of which the following is a specification.

The object of this invention is to change the speed ratio, either in a like or reverse direction, of two rotating parts mounted upon an axis common to both. My invention accomplishes this in a very compact and efficient manner. It is especially applicable to electric driven vehicles, but may be used for automobiles driven by other powers and may find some applications in other divisions of mechanics.

Referring to the accompanying drawings: Figure 1 is a longitudinal sectional view of an axis containing a specially designed electric motor, in which both the armature and the field magnet rotate, and the mechanical movement upon which the invention is based. Fig. 2 is a cross section taken on the line A—B. Fig. 3 is a cross section taken on line C—D. Fig. 4 is a cross section on line E—F. Fig. 5 shows an alternative hub that may be substituted for the one shown in Fig. 1.

I prefer to use a motor in which the field magnet and the armature both rotate, and thus, by connecting the field to drive one wheel and the armature to drive the other, avoid the use of a differential gear for independent rotation, for the motor then acts as a perfect differential device. As the armature and the field rotate in opposite directions the reduction gearing has to be so constructed that the motion of one element is reversed in transmitting to the wheel, while that of the other element is transmitted without change of direction.

The motor is preferably mounted with its axis coinciding with the center line of the axle; and in its construction differs from most motors by having its field magnet inside, and the armature outside in the form of a Gramme ring. This form of construction produces a motor very light in weight for a given power, and also has great cooling advantages combined with water proof construction.

The field magnet 1 is mounted upon the shaft 2, and is energized by coil 3. Collecting rings 4, 4′, 4″ and 4‴ serve to take the current from conducting brushes and, by means of proper conductors, transmit it to the field terminals and the commutator brushes.

The armature core is represented by 5 and the coils by 6, the commutator 7, and the commutator brushes 8 and 8′. The casing 9 slopes down, in the form of a cone, and terminates in the rotatory shaft 10, of which it is a part. An eccentric 11, is rigidly carried by, being keyed, upon the shaft 10, and sleeved over the eccentric is a set of rollers 12, comprising a roller bearing; the latter is surrounded by a casing 13, having an enlarged portion projecting over the ends of the rollers and inclosing a gyratory gear of the internal type 14, which meshes with gear 15. As shown in the drawings the gear 14 is thus, in effect, rotatably carried by the eccentric member in a planetary orbit, the rollers relieving friction and facilitating slight play between the parts. The gear 15 is of the external type and is fixed to the axle, being thus unrotatably supported thereby. The roller bearing 16, shown inside of gear 15, is used for supporting the shaft 10, which is, as shown, located proximate the longitudinal center of the axle. The casing 13, has an extension opposite the gear end with which is universally jointed a member,—shown in the drawings as a Cardan shaft 17.

The unrotatable axle, which I will designate by the number 18, is made up from the assembly of the framework, $a$, gear casings $b$ and $b'$, the tubular sections $c$ and $c'$, and the yokes $d$ and $d'$. The latter is not shown as the two hubs and attachments are duplicates. The cylindrical piece 19, is, proximate one of the ends of the axle, trunnioned in the yoke $d$, and carries within it the ball bearings 20 and 21, inside of which is rotatable the cylindrical part, or driven member 22, with which is universally jointed the other terminal end of the Cardan shaft 17, 22 being thus supported by the axle independently of the shaft 10.

22 is rigidly attached to the hub of the wheel 23 by means of the pin 24.

It will be noted that the construction is such that the driving shaft 10 does not carry the driven member 22. That is to say the driven member is independent of the shaft which transmits power to the gyratory driving gear 14, except in so far as said driven member is, at, or proximate, its axis of rotation, universally jointed with and constantly influenced by, a therewith rotatable longitudinally extended connection or shaft, which is likewise constantly influenced by, and universally jointed with, the gyratory driving gear at approximately the latter's axis of rotation. It results that the said connection, or shaft, is always inclined relatively to both of said axes, and rotates on its own axis while moving in what is substantially a cone-shaped path, the apex of which coincides with the axis of rotation of the driven member, and its base with the planetary orbit of the gear 14. It will also be noted that the said means employed to so unite the gyratory driving gear with the driven member, are, as indicated by the universal joints of the Cardan shaft, universally flexible, relatively to the parts thereby operatively joined. These noted features of the construction serve to increase power efficiency, to abort shocks transmitted from the wheel 23, to insure regularity of movement in the driving mechanism, and to dispense with "straightening out" devices for the type of gears referred to.

Mounted upon the field shaft 2, is the eccentric 11, which is supported by the roller bearing 16'. Sleeved upon the eccentric portion is the external gear 14' with the roller bearing 12' inserted between them. This gear (14') meshes with the internal gear 15', which is fixed to the unrotatable axle 18. Gear 14' is provided with the universal joint extension in the same manner as in gear 14, and from this point to the wheel the construction is a duplicate of the other end of the axle.

The operation of the mechanism is as follows: Eccentric 11, which is mounted on the armature shaft, rotates and carries with it gear 14, the pitch line rolling around the pitch line of gear 15. If both gears were supplied with the same number of teeth, gear 14 would have no rotary motion and would simply keep contacting around different points of the periphery, but, as the larger gear has a greater number of teeth it is caused to rotate upon its own axis, in the same direction as the driving gear, at a slow speed of revolution; the nearer the diameters are to being equal the slower the gear 14 will rotate; in other words, the greater the speed ratio of reduction will be. The axis of gear 14 rotates in an orbit of its own around the center line of the axle, with a radius equal to the eccentricity of the eccentric. Gearing of this type up to this point is not new, but the former methods of transmitting the power from the rotary gear has met with the objection that it had low power efficiency and the motion was irregular, unless two additional gears were inserted. By transmitting the power by means of a universal jointed shaft, however, the motion is absolutely uniform and, as I have found by experience, is very efficient. The Cardan shaft 17 yieldingly transmits the power from the gear to the hub of the wheel, as will readily be seen from the drawing. In transmitting the power from the field shaft it is desired to reverse the direction of rotation, and to accomplish this the following changes are necessary; the gear 13' which rotates upon the eccentric 11' is of the external type, instead of internal as used upon the other end, and meshes with the internal gear 15', which is fixed; the Cardan shaft is attached to the gear 13', and from that point to the hub the construction is a duplicate of that at the other end.

Steering and driving combined in one axle is often found to be desirable, as, for example, when driving by all four wheels; for this reason I have shown the wheel pivoted in a fork of the axle with all provision made for the combined steering and driving. In Fig. 5, I have shown the construction as it would be with the steering provided for in a separate axle.

I claim—

1. In combination, a pair of differentially rotatable driving shafts having a common axis; means to rotate said shafts; a pair of rotatable driven members a rotatable gear of the internal type eccentrically carried by one of said shafts; a stationary gear of the external type meshed with said rotatable gear; means comprising a universally jointed shaft to operatively unite said rotatable gear with one of said driven members; a rotatable gear of the external type carried by the other of said shafts; a stationary gear of the internal type meshed with said last mentioned rotatable gear; and means comprising a universally jointed shaft to operatively unite said last mentioned rotatable gear with the other of said driven members.

2. In a vehicle, a relatively stationary axle; a pair of differentially rotatable driving shafts supported by said axle and having a common axis; means to simultaneously oppositely rotate said shafts at different speeds; a pair of tractor wheels on said axle; a rotatable gear of the internal type; means carried by one of said shafts to gyrate said gear in an eccentric orbit; a stationary gear of the external type carried by said axle and meshed with said rotatable gear; means comprising a universally jointed shaft to operatively unite said rotatable gear with one of said wheels; a rotatable gear of the external type; means carried by the other of said shafts to gyrate said last mentioned rotatable gear in an eccentric orbit; a stationary gear of the internal type carried by said axle and meshed with said last mentioned rotatable gear; and means, comprising a universally jointed shaft, to operatively unite said last mentioned rotatable gear with the other of said wheels.

Signed at Jersey City in the county of Hudson and State of New Jersey this 8th day of July A. D. 1911.

HARRY EUGENE DEY.

Witnesses:
FRANCIS H. BONNER,
DAVID T. BONNER.